US012700025B2

(12) United States Patent
Shen et al.

(10) Patent No.: US 12,700,025 B2
(45) Date of Patent: Aug. 4, 2026

(54) TICKET PROCESSING

(71) Applicant: Alipay (Hangzhou) Information Technology Co., Ltd., Hangzhou (CN)

(72) Inventors: Haitao Shen, Hangzhou (CN); Min Huang, Hangzhou (CN); Jianhui Hua, Hangzhou (CN); Lijian Chen, Hangzhou (CN); Junwei Wang, Hangzhou (CN)

(73) Assignee: Alipay (Hangzhou) Information Technology Co., Ltd., Hangzhou (CN)

( * ) Notice: Subject to any disclaimer, the term of this patent is extended or adjusted under 35 U.S.C. 154(b) by 274 days.

(21) Appl. No.: 18/561,579

(22) PCT Filed: Jul. 4, 2022

(86) PCT No.: PCT/CN2022/103541
§ 371 (c)(1),
(2) Date: Nov. 16, 2023

(87) PCT Pub. No.: WO2022/247964
PCT Pub. Date: Dec. 1, 2022

(65) Prior Publication Data
US 2024/0257193 A1      Aug. 1, 2024

(30) Foreign Application Priority Data
May 25, 2021      (CN) .......................... 202110572299.8

(51) Int. Cl.
*G06Q 30/04*      (2012.01)
*G06Q 20/04*      (2012.01)

(52) U.S. Cl.
CPC ........... *G06Q 30/04* (2013.01); *G06Q 20/045* (2013.01)

(58) Field of Classification Search
CPC ...... G06Q 30/04; G06Q 20/045; G06Q 20/14; G06Q 40/125
(Continued)

(56) References Cited

U.S. PATENT DOCUMENTS

2018/0189870 A1      7/2018   Weinflash et al.
2021/0304168 A1*      9/2021   Gu ...................... G06Q 20/0855

FOREIGN PATENT DOCUMENTS

CN          109242402 A  *  1/2019  ........... G06Q 40/125
CN          110648135 A  *  1/2020  ........... G06Q 20/023
(Continued)

OTHER PUBLICATIONS

Incoming Written Opinion of the International Searching Authority (ISA) Nov. 16, 2023 (English version).*
(Continued)

*Primary Examiner* — Russell S Glass
(74) *Attorney, Agent, or Firm* — Womble Bond Dickinson (US) LLP

(57)          ABSTRACT

Embodiments of this specification provide a ticket processing method and apparatus. The ticket processing method includes: obtaining a business payment bill obtained after an institution member makes a business payment, and storing the business payment bill in a member account of the institution member; synchronizing the business payment bill from the member account to a co-managed account that is of an institution to which the institution member belongs and that is associated with the member account, to add the business payment bill to a bill list in the co-managed account; obtaining, based on a ticket addition request submitted by the institution member for the business payment bill, a ticket associated with the business payment bill; and returning the ticket to the co-managed account based on an account association relationship between the member
(Continued)

account and the co-managed account, to associate the ticket with the business payment bill in the bill list.

14 Claims, 5 Drawing Sheets

(58) Field of Classification Search
USPC ........................................................... 705/34
See application file for complete search history.

(56) References Cited

FOREIGN PATENT DOCUMENTS

| | | | | |
|---|---|---|---|---|
| CN | 111402026 A | | 7/2020 | |
| CN | 111552954 A | | 8/2020 | |
| CN | 112132565 A | * | 12/2020 | ........... G06Q 20/102 |
| CN | 113222724 A | | 8/2021 | |
| CN | 110400139 B | * | 6/2022 | ........... G06Q 20/367 |

OTHER PUBLICATIONS

The International Search Report and Written Opinion of the International Searching Authority for International Application No. PCT/CN2022/103541 mailed on Sep. 29, 2022.

* cited by examiner

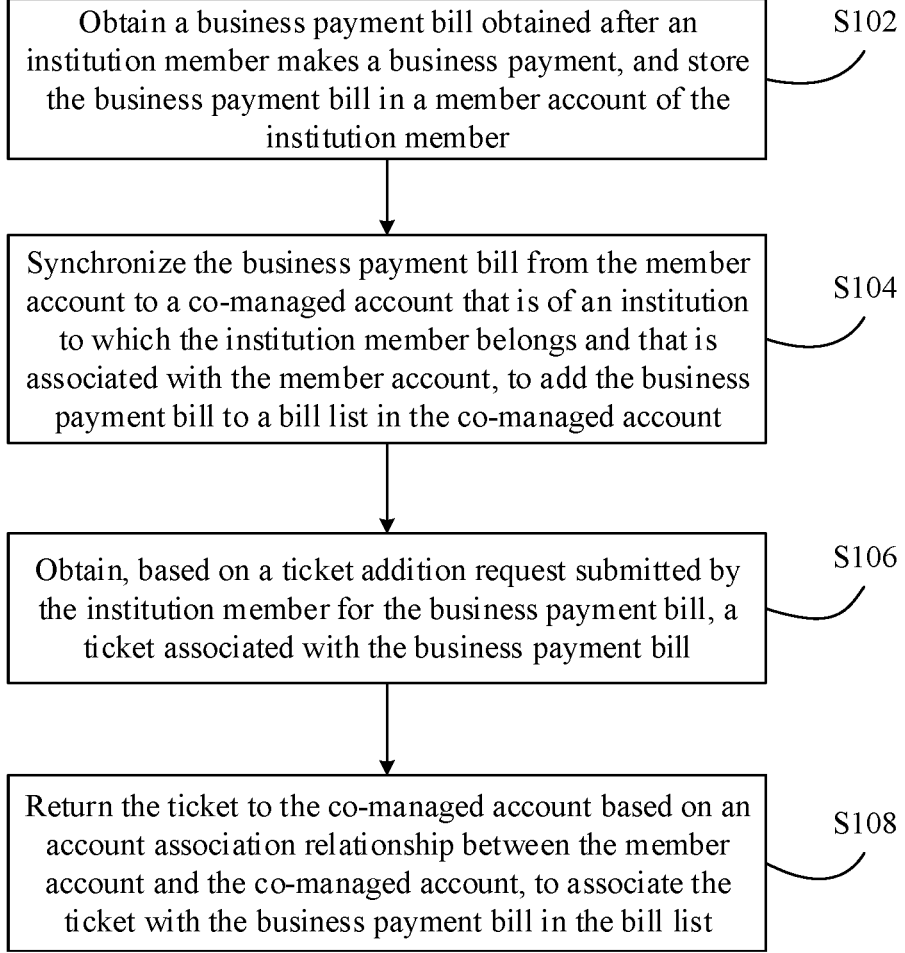

Obtain a business payment bill obtained after an institution member makes a business payment, and store the business payment bill in a member account of the institution member

S102

Synchronize the business payment bill from the member account to a co-managed account that is of an institution to which the institution member belongs and that is associated with the member account, to add the business payment bill to a bill list in the co-managed account

S104

Obtain, based on a ticket addition request submitted by the institution member for the business payment bill, a ticket associated with the business payment bill

S106

Return the ticket to the co-managed account based on an account association relationship between the member account and the co-managed account, to associate the ticket with the business payment bill in the bill list

TICKET PROCESSING

CROSS-REFERENCE TO RELATED APPLICATIONS

This application is a national-stage entry of International Application No. PCT/CN2022/103541 filed on Jul. 4, 2022, which claims priority to Chinese Application No. 202110572299.8 filed on May 25, 2021, the contents of which are incorporated herein by reference in their entirety.

TECHNICAL FIELD

This specification relates to the field of data processing technologies, and in particular, to a ticket processing method and apparatus.

BACKGROUND

Tickets usually have specific credential effect. For example, the tickets are used as an original basis for accounting in enterprises, and are also an important basis for law enforcement inspection by audit and tax authorities. When performing expense reimbursement based on a ticket, an institution employee needs to fill in a report form and submit the ticket for review by a ticket manager of an institution. A reimbursement procedure is cumbersome, a reimbursement process takes a long time, and both an institution member and the ticket manager need to spend much time and energy.

SUMMARY

One or more embodiments of this specification provide a ticket processing method. The ticket processing method includes: obtaining a business payment bill obtained after an institution member makes a business payment, and storing the business payment bill in a member account of the institution member; synchronizing the business payment bill from the member account to a co-managed account that is of an institution to which the institution member belongs and that is associated with the member account, to add the business payment bill to a bill list in the co-managed account; obtaining, based on a ticket addition request submitted by the institution member for the business payment bill, a ticket associated with the business payment bill; and returning the ticket to the co-managed account based on an account association relationship between the member account and the co-managed account, to associate the ticket with the business payment bill in the bill list.

One or more embodiments of this specification provide a ticket processing apparatus. The ticket processing apparatus includes: a bill obtaining module, configured to obtain a business payment bill obtained after an institution member makes a business payment, and store the business payment bill in a member account of the institution member; a bill synchronization module, configured to synchronize the business payment bill from the member account to a co-managed account that is of an institution to which the institution member belongs and that is associated with the member account, to add the business payment bill to a bill list in the co-managed account; a ticket addition module, configured to obtain, based on a ticket addition request submitted by the institution member for the business payment bill, a ticket associated with the business payment bill; and a ticket return module, configured to return the ticket to the co-managed account based on an account association relationship between the member account and the co-managed account, to associate the ticket with the business payment bill in the bill list.

One or more embodiments of this specification provide an electronic device, including a processor and a storage configured to store computer-executable instructions. When the computer-executable instructions are executed, the processor is enabled to perform the following operations: obtaining a business payment bill obtained after an institution member makes a business payment, and storing the business payment bill in a member account of the institution member; synchronizing the business payment bill from the member account to a co-managed account that is of an institution to which the institution member belongs and that is associated with the member account, to add the business payment bill to a bill list in the co-managed account; obtaining, based on a ticket addition request submitted by the institution member for the business payment bill, a ticket associated with the business payment bill; and returning the ticket to the co-managed account based on an account association relationship between the member account and the co-managed account, to associate the ticket with the business payment bill in the bill list.

One or more embodiments of this specification provide a storage medium, configured to store computer-executable instructions. When the computer-executable instructions are executed, the following procedure is implemented: obtaining a business payment bill obtained after an institution member makes a business payment, and storing the business payment bill in a member account of the institution member; synchronizing the business payment bill from the member account to a co-managed account that is of an institution to which the institution member belongs and that is associated with the member account, to add the business payment bill to a bill list in the co-managed account; obtaining, based on a ticket addition request submitted by the institution member for the business payment bill, a ticket associated with the business payment bill; and returning the ticket to the co-managed account based on an account association relationship between the member account and the co-managed account, to associate the ticket with the business payment bill in the bill list.

BRIEF DESCRIPTION OF DRAWINGS

To describe the technical solutions in one or more embodiments of this specification or in the conventional technology more clearly, the following briefly describes the accompanying drawings needed for describing the embodiments or the conventional technology. Clearly, the accompanying drawings in the following description merely show some embodiments of this specification, and a person of ordinary skill in the art can still derive other drawings from these accompanying drawings without creative efforts.

FIG. 1 is a processing flowchart of a ticket processing method according to one or more embodiments of this specification;

DESCRIPTION OF EMBODIMENTS

To make a person skilled in the art understand the technical solutions in one or more embodiments of this specification better, the following clearly and comprehensively describes the technical solutions in the one or more embodiments of this specification with reference to the accompanying drawings in the one or more embodiments of this specification. Clearly, the described embodiments are merely some but not all of the embodiments of this specification. All other embodiments obtained by a person of ordinary skill in the art based on the one or more embodiments of this specification without creative efforts shall fall within the protection scope of this specification.

Figure 2:
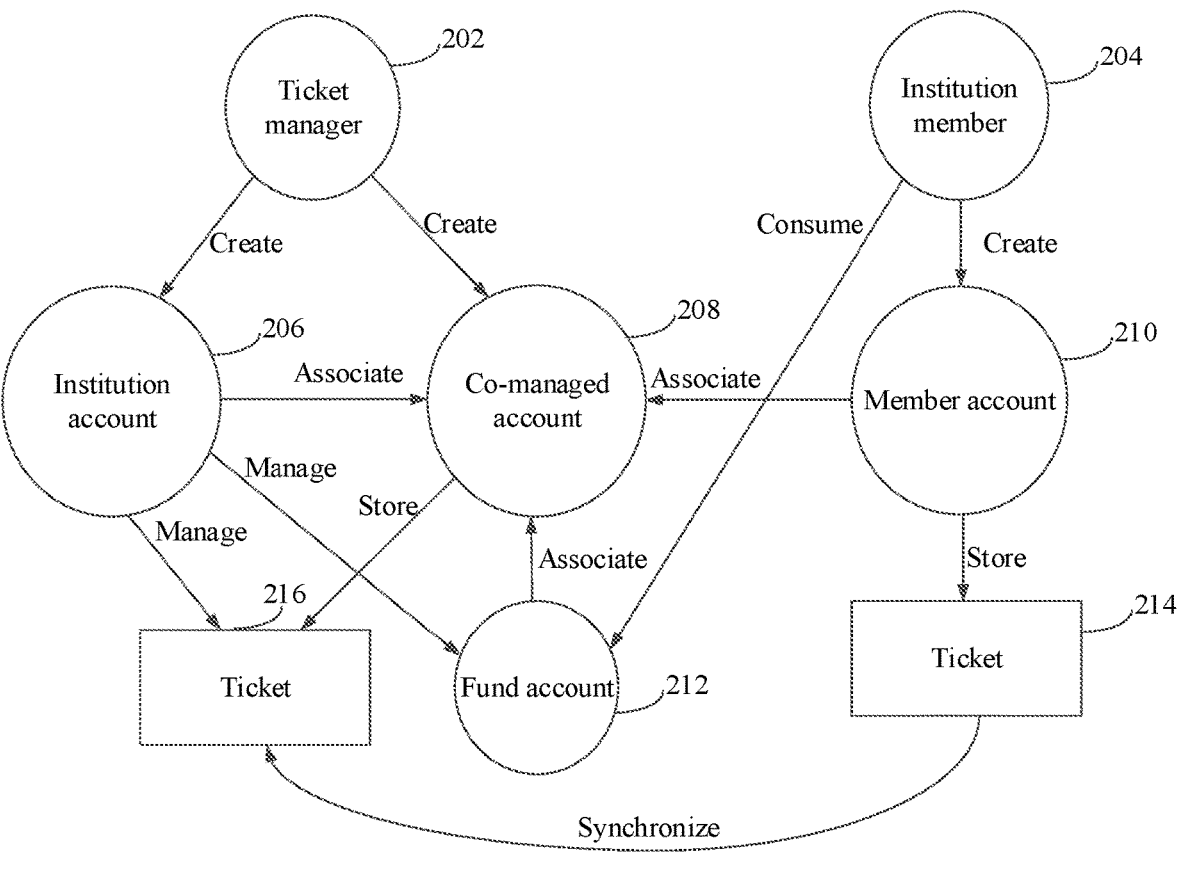
FIG. 2 is a schematic diagram of a relationship among an account user, an account, and a ticket in a ticket processing method according to one or more embodiments of this specification.
Figure 3:
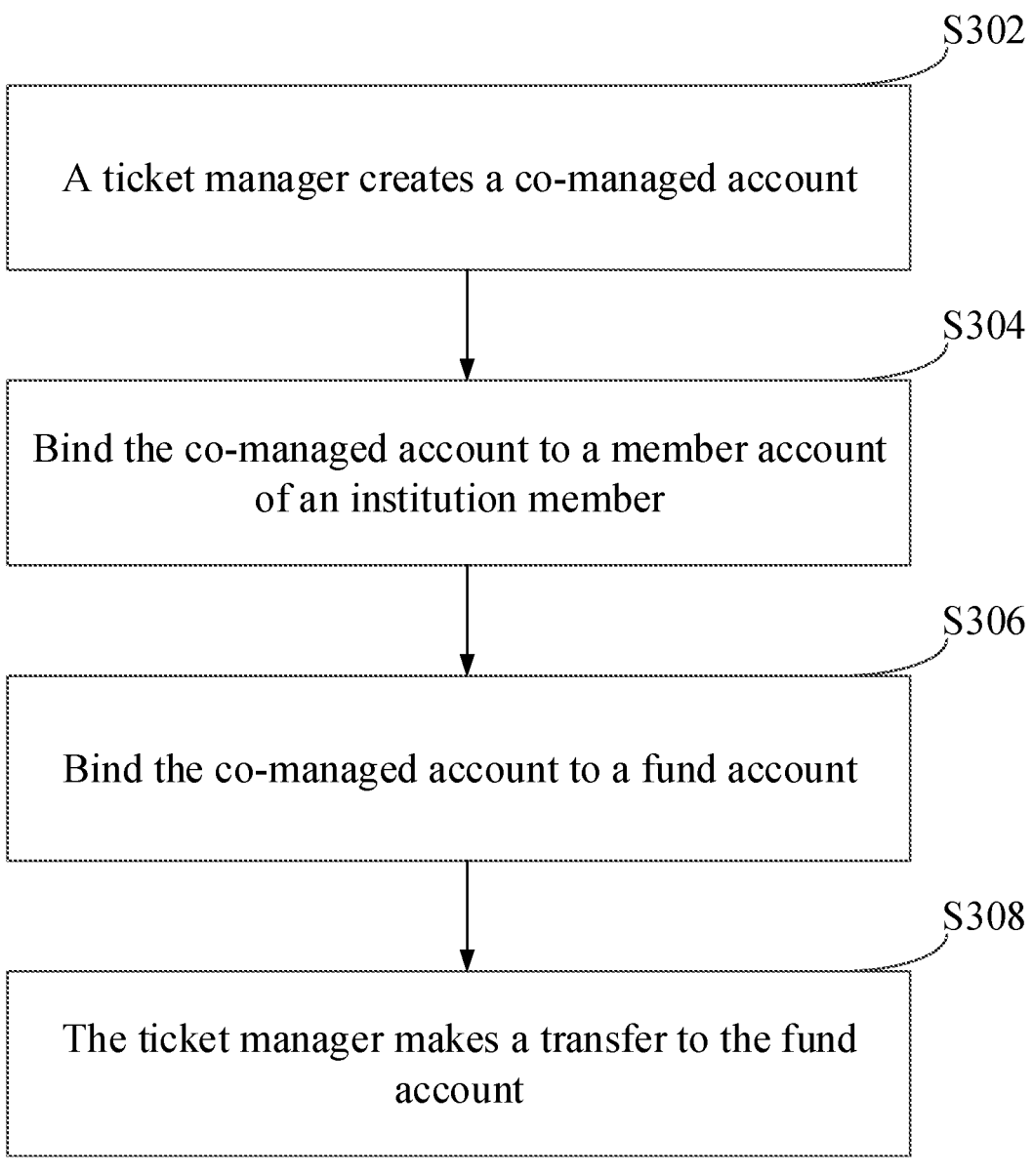
FIG. 3 is a processing flowchart of creating a co-managed account in a ticket processing method according to one or more embodiments of this specification.

This specification provides an embodiment of a ticket processing method. FIG. 1 is a processing flowchart of a ticket processing method according to an embodiment. FIG. 2 is a schematic diagram of a relationship among an account user, an account, and a ticket in a ticket processing method according to an embodiment. FIG. 3 is a processing flowchart of creating a co-managed account in a ticket processing method according to an embodiment.

The ticket processing method provided in this embodiment can be performed by a server.

As shown in FIG. 1, the ticket processing method provided in this embodiment specifically includes the following steps S102 to S108.

According to the ticket processing method provided in this embodiment, when a business payment bill is obtained by using a member account, the business payment bill is synchronized to a co-managed account, and when a ticket associated with the business payment bill is obtained, the ticket is returned to the co-managed account. In this way, a ticket reimbursement procedure of an institution member can be simplified, a waiting time needed for the reimbursement procedure can be shortened, and management efficiency of a ticket manager of an institution can be correspondingly improved.

Step S102: Obtain a business payment bill obtained after an institution member makes a business payment, and store the business payment bill in a member account of the institution member.

An institution can be an enterprise, can be a school, can be an association, or can be another organization. An example in which the institution is an enterprise is used. In this case, the institution member can be an employee of the enterprise, and a ticket manager in the following can be a manager of the enterprise or a financial employee specified by the enterprise. The institution member and the ticket manager belong to the same institution.

A business payment can occur in a business trip scenario, for example, a scenario in which a train ticket between a business trip location and a home location is purchased; can occur in a scenario in which items needed for work are purchased, for example, a scenario in which office supplies are purchased; or can occur in a scenario in which a customer is entertained, for example, a scenario in which the customer is invited to have a dinner. The above-mentioned several scenarios are merely several examples, and there are other business payment scenarios. Details are omitted for simplicity here.

The member account of the institution member can be a data account that can be used by the institution member to perform a payment operation, for example, a personal platform account of the institution member on a third-party payment platform, a social account, or a platform account on a shopping platform.

Optionally, before the step of obtaining a business payment bill obtained after an institution member makes a business payment, and storing the business payment bill in a member account of the institution member is performed, the ticket processing method provided in this embodiment further includes: creating a co-managed account based on a co-managed account establishment request of the ticket manager; associating an institution account and a fund account of the ticket manager with the co-managed account based on an institution role preset for the co-managed account; and associating a member account of each institution member with the co-managed account based on a member role preset for the co-managed account.

The institution account of a ticket manager can be a personal data account used by the ticket manager, for example, a personal platform account of an enterprise legal person on a third-party payment platform; or can be an institution account of an institution to which the ticket manager belongs, for example, an enterprise account of an enterprise on a third-party payment platform.

It is worthwhile to note that a ticket manager who creates the institution account and the co-managed account and a ticket manager who performs ticket management by using the institution account and the co-managed account in an actual scenario can be the same person or possibly are not the same person. For example, after creating an institution account and a co-managed account, an enterprise manager grants some permissions of the institution account to a specified financial employee, so that the financial employee can perform ticket management by using the institution account and the co-managed account.

In FIG. 2, account users include an institution member 204 and a ticket manager 202, accounts include an institution account 206, a co-managed account 208, a member account 210, and a fund account 212, and tickets include a ticket 214 stored in the member account 210 and a ticket 216 stored in the co-managed account 208.

As shown in FIG. 2 and FIG. 3, in step S302, the ticket manager creates a co-managed account. That is, the ticket manager 202 in FIG. 2 creates the co-managed account 208.

In step S304, the co-managed account is bound to the member account of the institution member. That is, the member account 210 in FIG. 2 is associated with the co-managed account 208.

In step S306, the co-managed account is bound to a fund account. That is, the fund account 212 in FIG. 2 is associated with the co-managed account 208.

The fund account 212 in FIG. 2 can be associated with the co-managed account 208 through mounting. Mounting is a process in which an operating system makes computer files and directories on a storage device (for example, a hard disk, a CD-ROM, or a shared resource) accessible to a user through a computer file system. That the co-managed account 208 is mounted to the fund account 212 can be, for example, understood as follows: The member account 210 associated with the co-managed account 208 can access the fund account 212 by using the co-managed account 208. Specifically, when a payment operation is performed by using the member account 210, the fund account 212 can be selected as a contribution account. The institution account 206 associated with the co-managed account 208 can access the fund account 212 by using the co-managed account 208. Specifically, the institution account 206 can transfer funds to the fund account 212.

In step S308, the ticket manager makes a transfer to the fund account. That is, the ticket manager 202 in FIG. 2 manages the fund account 212 by using the institution account 206. A management manner can be that the fund account 212 is specified as a receiver of a transfer, and funds in another account are transferred to the fund account 212.

It should be emphasized that a definition of the co-managed account in this embodiment is different from a co-managed account opened in a bank. The co-managed account is an account of a different type from the member account or the institution account, and the account can be considered as a virtual account that cannot be logged in. An institution role and a member role can be preset for the co-managed account. Different functions and permissions can be configured based on the institution role and the member role. The institution role includes a fund role and a manager role.

The fund account associated with the co-managed account based on the fund role can be considered as a public wallet. That is, each member account associated with the co-managed account based on the member role can select the fund account as a payment method and make a payment by using funds in the fund account to pay.

Usually, when making a business payment by using an employee account, an institution employee selects the fund account as a payment method. That is, a payment is directly made by using funds of an institution, and the employee does not need to advance funds for subsequent reimbursement.

The institution account associated with the co-managed account based on the manager role can be considered as a manager of the co-managed account. The ticket manager cannot directly log in to the co-managed account, but the ticket manager can manage a ticket in the co-managed account by using the institution account. As shown in FIG. 2, the institution account 206 manages the ticket 216. The ticket 216 is stored in the co-managed account 208, and the ticket 216 is obtained after the ticket 214 stored in the member account 210 is synchronized to the co-managed account 208.

The member account linked to the co-managed account based on the member role can be considered as bill provider and a ticket provider of the co-managed account. In addition, each member account can be used to make a business payment by using a fund account corresponding to the co-managed account. As shown in FIG. 2, the institution member 204 consumes by using funds in the fund account 212. The ticket 214 stored in the member account 210 is synchronized to the co-managed account 208, and a ticket synchronized and sent to the co-managed account 208 is the ticket 216 stored in the co-managed account 208.

The institution account of the ticket manager can be associated with one or more co-managed accounts. The co-managed account can be associated with the fund account, and one co-managed account can be associated with a plurality of member accounts.

Optionally, the obtaining a business payment bill obtained after an institution member makes a business payment includes: obtaining a confirmation request for making a business payment by the institution member, where the confirmation request carries a member account identifier of the member account of the institution member and a fund account identifier of a fund account of the institution, and the member account and the fund account are associated with the co-managed account; and obtaining the business payment bill obtained after a business payment is made based on the member account identifier and the fund account identifier.

With reference to FIG. 2, it can be learned that the member account 210 is associated with the co-managed account 208, and the fund account 212 is associated with the co-managed account 208. In this case, the institution member 204 can make a business payment by using funds in the fund account 212 and by using an association relationship between the member account 210 and the co-managed account 208 and an association relationship between the co-managed account 208 and the fund account 212.

In specific implementation, for example, after a payment operation is triggered by using the personal platform account of the institution member on the third-party payment platform, a payment method list including a plurality of payment methods bound to the personal platform account can be obtained. The institution member selects the fund account of the institution as a payment method, confirms to make a payment, and sends the confirmation request for making a business payment. The confirmation request carries the member account identifier of the personal platform account and the fund account identifier of the fund account.

After the business payment is made based on the member account identifier and the fund account identifier, the server obtains the business payment bill. All bills whose payment methods are the fund account of the institution are business payment bills. The server can determine, based on the fund account identifier, whether a newly obtained bill of the member account is a business payment bill.

Step S104: Synchronize the business payment bill from the member account to a co-managed account that is of an institution to which the institution member belongs and that is associated with the member account, to add the business payment bill to a bill list in the co-managed account.

After the server obtains the business payment bill, the server can synchronize the business payment bill from the member account to the co-managed account that is of the institution to which the institution member belongs and that is associated with the member account. As shown in FIG. 2, the ticket 214 is synchronized from the member account 210 to the co-managed account 208 to obtain the ticket 216. Synchronization can be understood as copying data in an account and sending the data to another account. The bill list is stored in the co-managed account. The bill list includes a plurality of business payment bills respectively synchronized from different member accounts to the co-managed account.

Step S106: Obtain, based on a ticket addition request submitted by the institution member for the business payment bill, a ticket associated with the business payment bill.

Optionally, after the step of obtaining a business payment bill obtained after an institution member makes a business payment, and storing the business payment bill in a member account of the institution member is performed, and before the step of obtaining, based on a ticket addition request submitted by the institution member for the business payment bill, a ticket associated with the business payment bill is performed, the ticket processing method provided in this embodiment further includes: obtaining, based on a bill access request of the institution member, a member bill list that is in the member account and that includes each business payment bill; querying a ticket status of any business payment bill in the member bill list for the business payment bill; and if the ticket status is "not returned", obtaining addition control configuration data of a ticket addition control; and rendering and generating a display page of the member bill list based on the member bill list and the addition control configuration data.

In specific implementation, the server can obtain the business payment bill through filtering from a bill of the member account based on the fund account identifier, to obtain the member bill list including each business payment bill, or can add a specified mark to the business payment bill when obtaining the business payment bill for the first time and synchronizing the business payment bill to the co-managed account, and then obtain the member bill list including the business payment bill through filtering based on the specified mark.

For the any business payment bill, the server can store an association relationship between the business payment bill and a ticket. If the ticket associated with the business payment bill is obtained through query, it is determined that the ticket status is "returned". If it is determined, after query, that the ticket associated with the business payment bill does not exist, it is determined that the ticket status is "not returned". At any time point, a ticket status of one business payment bill can only be one of "returned" and "not returned".

If the ticket status is "not returned", the addition control configuration data of the ticket addition control is obtained; and the display page of the member bill list is rendered and generated based on the member bill list and the addition control configuration data, so that the ticket addition control is displayed on the display page of the member bill list. The institution member can add, by using the ticket addition control, the ticket associated with the business payment bill.

Optionally, before the step of obtaining, based on a ticket addition request submitted by the institution member for the business payment bill, a ticket associated with the business payment bill is performed, the ticket processing method provided in this embodiment further includes: obtaining ticket issuance information of a merchant corresponding to the business payment bill; determining, based on the ticket issuance information, whether the merchant supports issuance of an electronic ticket; and if the merchant supports issuance of an electronic ticket, obtaining first control configuration data of an electronic ticket request control; and configuring a ticket obtaining manner of the business payment bill based on the first control configuration data.

The server obtains the ticket issuance information of the merchant corresponding to the business payment bill. The ticket issuance information includes information about whether the merchant supports issuance of an electronic ticket and/or information about whether the merchant supports issuance of a paper ticket. For example, ticket issuance information of a merchant 1 includes that issuance of an electronic ticket is not supported, and issuance of a paper ticket is supported.

The server determines, based on the ticket issuance information, whether the merchant supports issuance of an electronic ticket; and if the merchant supports issuance of an electronic ticket, obtains the first control configuration data of the electronic ticket request control; and configures the ticket obtaining manner of the business payment bill based on the first control configuration data. For example, a button is configured on a right side of a business payment bill 1, and the institution member can request an electronic ticket from the merchant by clicking the button. Like an ordinary paper ticket, the electronic ticket has a code issued by a tax institution. Therefore, the electronic ticket has the same credential effect as the ordinary paper ticket. However, the electronic ticket is more convenient than the ordinary paper ticket in aspects such as ticket issuance and reimbursement. Therefore, if the merchant supports issuance of an electronic ticket, the electronic ticket request control is preferably configured, to improve efficiency and convenience of the aspects such as ticket issuance and reimbursement.

Optionally, if an execution result obtained after the step of determining, based on the ticket issuance information, whether the merchant supports issuance of an electronic ticket is no, the following operations are performed: determining, based on the ticket issuance information, whether the merchant supports issuance of a paper ticket; and if the merchant supports issuance of a paper ticket, obtaining second control configuration data of a paper ticket request control and third control configuration data of a paper ticket upload control, and configuring the ticket obtaining manner of the business payment bill based on the second control configuration data and the third control configuration data; or if the merchant does not support issuance of a paper ticket, obtaining third control configuration data, and configuring the ticket obtaining manner of the business payment bill based on the third control configuration data.

It is determined, based on the ticket issuance information, whether the merchant supports issuance of a paper ticket. If the merchant supports issuance of a paper ticket, the second control configuration data of the paper ticket request control and the third control configuration data of the paper ticket upload control are obtained, and the ticket obtaining manner of the business payment bill is configured based on the second control configuration data and the third control configuration data. For example, an icon control is configured on the right side of the business payment bill 1, and the institution member can request a paper ticket from the merchant by clicking the icon control. For another example, an arrow control is configured on the right side of the business payment bill 1, and the institution member can click the arrow control to obtain, through image capture, a ticket image of a paper ticket as a ticket associated with the business payment bill, or can use a ticket obtained after OCR processing is performed on a ticket image as a ticket associated with the business payment bill.

If the merchant does not support issuance of a paper ticket, in this case, the institution member can find a ticket of a bill of the same type as the business payment bill and use the ticket as a replacement to the ticket associated with the business payment bill. The server obtains the third control configuration data, and configures the ticket obtaining manner of the business payment bill based on the third control configuration data. For example, an arrow control is configured on the right side of the business payment bill 1, and the institution member can click the arrow control to obtain, through image capture, a ticket image of a paper ticket as a ticket associated with the business payment bill, or can use a ticket obtained after OCR processing is performed on a ticket image as a ticket associated with the business payment bill.

Optionally, the obtaining, based on a ticket addition request submitted by the institution member for the business payment bill, a ticket associated with the business payment bill includes: obtaining configuration data of an associated ticket upload page based on an associated ticket upload request submitted by the institution member for the business payment bill, to generate an associated ticket upload page corresponding to the business payment bill; obtaining a ticket image of a paper ticket uploaded by the institution member on the ticket upload page; and performing OCR processing on the ticket image, to obtain the ticket associated with the business payment bill.

In specific implementation, if the institution member clicks a paper ticket upload control on a right side of a certain business payment bill for the business payment bill on a display page of the business payment bill, the server obtains configuration data of an associated ticket upload page based on an associated ticket upload request submitted by institution member for the business payment bill, to generate an associated ticket upload page corresponding to the business payment bill. On the associated ticket upload page, an OCR scanning function can be invoked to capture a ticket image of a paper ticket and perform OCR processing to obtain a ticket associated with the business payment bill.

Alternatively, on the associated ticket upload page, an image capture function can be invoked to capture a ticket image of a paper ticket and use the ticket image as a ticket associated with the business payment bill.

Optionally, the obtaining, based on a ticket addition request submitted by the institution member for the business payment bill, a ticket associated with the business payment bill includes: generating a ticket request message based on an electronic ticket obtaining request submitted by the institution member for the business payment bill, and sending the ticket request message to a merchant corresponding to the business payment bill, where the electronic ticket obtaining request carries a member account identifier and a bill identifier of the business payment bill; obtaining an electronic ticket sent by the merchant based on the member account identifier, where the electronic ticket is issued by the merchant based on the bill identifier; and associating the electronic ticket with the business payment bill.

In specific implementation, if the institution member clicks an electronic ticket request control on a right side of a certain business payment bill for the business payment bill on a display page of the business payment bill, the server obtains an electronic ticket obtaining request submitted by the institution member for the business payment bill, and the server generates a ticket request message based on the electronic ticket obtaining request, and sends the ticket request message to a merchant corresponding to the business payment bill. The merchant sends a requested electronic ticket to a member account based on a member account identifier. The electronic ticket is issued by the merchant based on a bill identifier carried in the ticket request message. The server associates the electronic ticket with the business payment bill.

Optionally, the obtaining, based on a ticket addition request submitted by the institution member for the business payment bill, a ticket associated with the business payment bill includes: determining, based on a bill selection operation performed by the institution member, a plurality of business payment bills selected by the institution member; and obtaining, based on a combined ticket addition request, tickets associated with the plurality of business payment bills.

In specific implementation, the institution member can click a multi-selection mode control on a display page of the business payment bill, and the institution member selects a plurality of business payment bills in a multi-selection mode, and clicks to combine tickets; the server determines, based on a bill selection operation performed by the institution member, the plurality of business payment bills selected by the institution member; the institution member can click the combined ticket addition control; and the server obtains a combined ticket addition request, and obtains, by uploading paper tickets or requesting electronic tickets from a merchant, tickets associated with the plurality of business payment bills.

Step S108: Return the ticket to the co-managed account based on an account association relationship between the member account and the co-managed account, to associate the ticket with the business payment bill in the bill list.

As shown in FIG. 2, the stored ticket 214 in the member account 210 is synchronized to the co-managed account 208, to obtain the ticket 216 stored in the co-managed account 208.

It can be understood that after the institution member uploads the ticket to the member account, the server immediately synchronizes the ticket to the co-managed account, to omit a process in which the institution member collects a ticket to be reimbursed, and reduce a workload of the institution member.

In step S104, after the server obtains the business payment bill, the server can synchronize the business payment bill from the member account to the co-managed account that is of the institution to which the institution member belongs and that is associated with the member account. Therefore, the bill list in the co-managed account includes the business payment bill synchronized from each member account. Therefore, after the ticket in the member account is synchronized to the co-managed account, the returned ticket can be associated with the business payment bill in the bill list based on the association relationship between the business payment bill and the ticket. The ticket manager can intuitively and clearly perceive, by using the institution account and the co-managed account, bills whose associated tickets are returned and bills whose associated tickets are not returned.

Optionally, the ticket processing method provided in this embodiment further includes: obtaining a bill access condition submitted by the ticket manager by using the institution account; obtaining a target bill list that meets the bill access condition from the bill list based on an association relationship between the institution account and the co-managed account; and processing, based on an associated ticket processing request submitted by the ticket manager for a target bill in the target bill list, a ticket associated with the target bill.

As shown in FIG. 2, the ticket manager 202 can manage, by using the institution account 206 and the co-managed account 208 associated with the institution account 206, the ticket 216 stored in the co-managed account 208.

The bill access condition includes and is not limited to a time period to which a bill belongs, an institution member, a bill type, a bill label, and a bill group.

For example, if the bill access condition is X-month Y-day to X-month Z-day, the ticket manager can obtain a business payment bill whose bill generation time falls within a time period from X-month Y-day to X-month Z-day from the bill list in the co-managed account through filtering based on the time period by using the institution account, to obtain the target bill list. A bill manager can process, by using the institution account, the target bill selected by the bill manager in the target bill list. A processing manner includes but is not limited to view processing, download processing, obtaining request prompt processing, rejection processing, and bill parameter statistics processing.

Optionally, the processing, based on an associated ticket processing request submitted by the ticket manager for a target bill in the target bill list, a ticket associated with the target bill includes: obtaining, based on a ticket view request submitted by the ticket manager for the target bill, a target ticket associated with the target bill and configuration data of a ticket display page, to render and generate a ticket display page of the target ticket.

The server obtains the ticket view request submitted by the ticket manager for the target bill by using the institution account. The ticket view request carries a bill identifier of the target bill. The server obtains, based on the bill identifier, the target ticket associated with the target bill and the configuration data of the ticket display page, to render and generate the ticket display page of the target ticket. The ticket associated with the target bill is displayed in the ticket display page Optionally, the processing, based on an associated ticket processing request submitted by the ticket manager for a target bill in the target bill list, a ticket associated with the target bill includes: sending, based on a ticket return prompt request submitted by the ticket manager for the target bill, ticket return prompt information to a member account that returns the target bill.

The server obtains the ticket return prompt request submitted by the ticket manager for the target bill by using the institution account. The ticket return prompt request carries a bill identifier of the target bill. The server determines, based on the bill identifier, the member account that returns the target bill, and sends the ticket return prompt information to the member account. The ticket return prompt information can be understood as follows: The business payment bill obtained after the institution member makes a business payment is synchronized to the co-managed account, but the associated ticket is not returned to the co-managed account for a long period of time. In this case, the ticket manager prompts the institution member to return the ticket as soon as possible by using the ticket return prompt information.

In conclusion, according to the ticket processing method provided in this embodiment, first, a business payment bill obtained after an institution member makes a business payment is obtained, and is stored in a member account of the institution member; then, the business payment bill is synchronized from the member account to a co-managed account that is of an institution to which the institution member belongs and that is associated with the member account, to add the business payment bill to a bill list in the co-managed account; then, a ticket associated with the business payment bill is obtained based on a ticket addition request submitted by the institution member for the business payment bill; and finally, the ticket is returned to the co-managed account based on an account association relationship between the member account and the co-managed account, to associate the ticket with the business payment bill in the bill list. In this technical solution, a ticket reimbursement procedure of the institution member can be simplified, a waiting time needed for the reimbursement procedure can be shortened, and management efficiency of the ticket manager of the institution can be correspondingly improved.

The ticket processing method provided in the embodiments is further described below with reference to a ticket reimbursement scenario.

Figure 4:
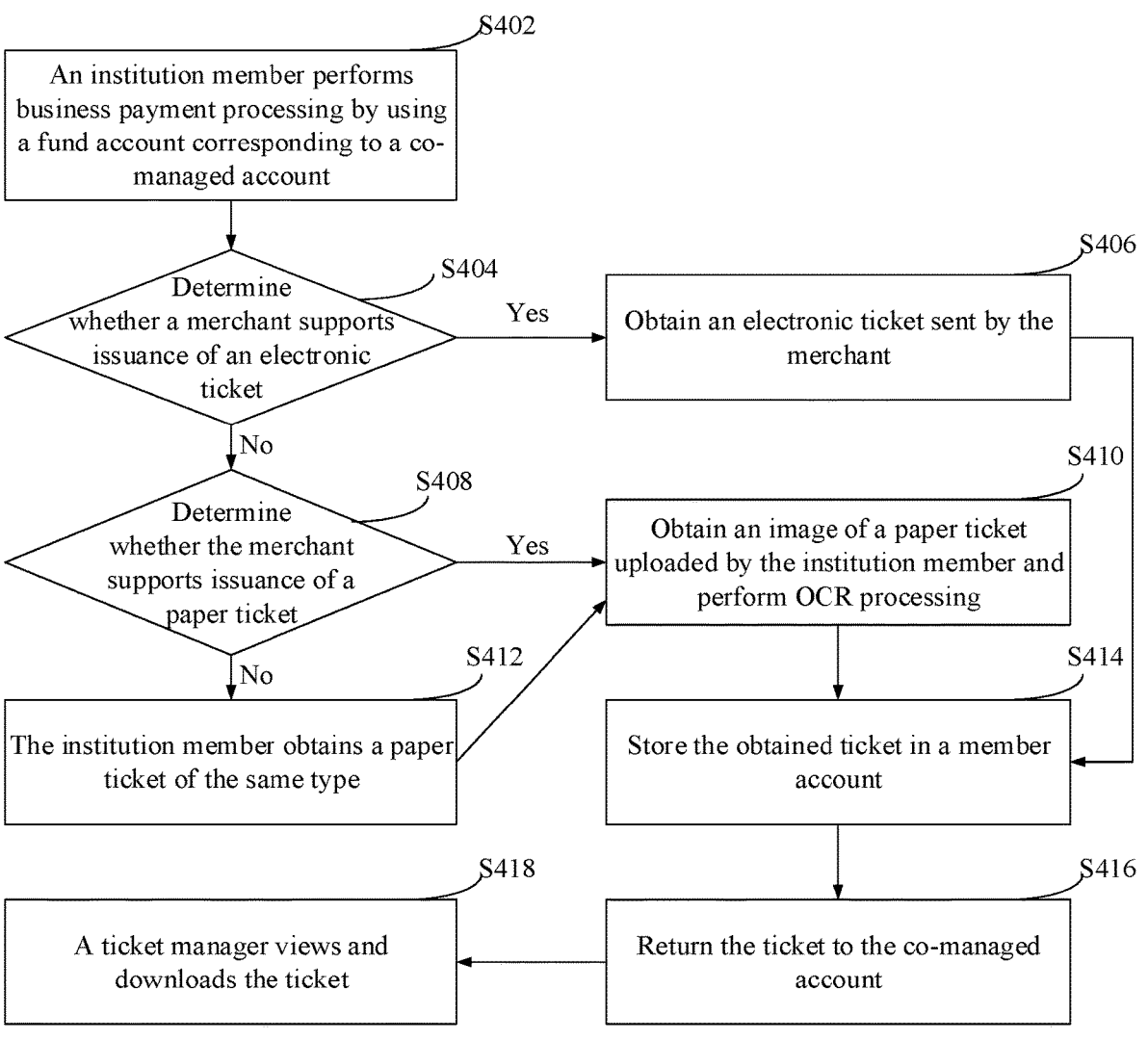
FIG. 4 is a processing flowchart of a ticket processing method applied to a ticket reimbursement scenario according to one or more embodiments of this specification.

FIG. 4 is a processing flowchart of a ticket processing method applied to a ticket reimbursement scenario according to an embodiment.

Step S402: An institution member performs business payment processing by using a fund account corresponding to a co-managed account.

Accounts, account users, and tickets in this embodiment are similar to the concepts corresponding to the embodiment shown in FIG. 1. Details are omitted for simplicity here. A server can obtain a business payment bill obtained after the institution member makes a business payment.

Step S404: Determine whether a merchant supports issuance of an electronic ticket.

The server obtains ticket issuance information of the merchant corresponding to the business payment bill. The ticket issuance information includes information about whether the merchant supports issuance of an electronic ticket and/or information about whether the merchant supports issuance of a paper ticket. The server determines, based on the ticket issuance information, whether the merchant supports issuance of an electronic ticket.

If the merchant supports issuance of an electronic ticket, step S406 is performed. If the merchant does not support issuance of an electronic ticket, step S408 is performed.

Step S406: Obtain an electronic ticket sent by the merchant.

If the merchant supports issuance of an electronic ticket, first control configuration data of an electronic ticket request control is obtained; and a ticket obtaining manner of the business payment bill is configured based on the first control configuration data. For example, a button is configured on a right side of a business payment bill 1, and the institution member can request an electronic ticket from the merchant by clicking the button.

If the institution member clicks an electronic ticket request control on a right side of a certain business payment bill for the business payment bill on a display page of the business payment bill, the server obtains an electronic ticket obtaining request submitted by the institution member for the business payment bill, and the server generates a ticket request message based on the electronic ticket obtaining request, and sends the ticket request message to a merchant corresponding to the business payment bill.

Like an ordinary paper ticket, the electronic ticket has a code issued by a tax institution. Therefore, the electronic ticket has the same credential effect as the ordinary paper ticket. However, the electronic ticket is more convenient than the ordinary paper ticket in aspects such as ticket issuance and reimbursement. Therefore, if the merchant supports issuance of an electronic ticket, the electronic ticket request control is preferably configured, to improve efficiency and convenience of the aspects such as ticket issuance and reimbursement.

The merchant sends a requested electronic ticket to a member account based on a member account identifier. The electronic ticket is issued by the merchant based on a bill identifier carried in the ticket request message. The server associates the electronic ticket with the business payment bill.

In some other embodiments, the obtaining an electronic ticket sent by the merchant can be obtaining an e-mail sent by the merchant, and an attachment of the e-mail is a requested electronic ticket.

Step S408: Determine whether the merchant supports issuance of a paper ticket. If the merchant supports issuance of a paper ticket, step S410 is performed. If the merchant does not support issuance of a paper ticket, step S412 is performed.

The server performs step S408. In specific implementation, the server determines, based on the ticket issuance information, whether the merchant supports issuance of a paper ticket. If the merchant supports issuance of a paper ticket, second control configuration data of a paper ticket request control and third control configuration data of a paper ticket upload control are obtained, and the ticket obtaining manner of the business payment bill is configured based on the second control configuration data and the third control configuration data. For example, an icon control is configured on the right side of the business payment bill 1, and the institution member can request a paper ticket from the merchant by clicking the icon control. For another example, an arrow control is configured on the right side of the business payment bill 1, and the institution member can click the arrow control to obtain, through image capture, a ticket image of a paper ticket as a ticket associated with the business payment bill, or can use a ticket obtained after OCR processing is performed on a ticket image as a ticket associated with the business payment bill.

It is worthwhile to note that when the merchant does not support issuance of an electronic ticket, regardless of whether the merchant supports issuance of a paper ticket, the institution member needs to upload, in a manner of capturing an image of a paper ticket, a paper ticket issued by the merchant or an alternative paper ticket obtained by the institution member, and store the paper ticket in the member account. In addition, in some scenarios, after the institution member makes a business payment, the paper ticket is immediately issued at the merchant. Therefore, in some embodiments, step S408 performed by the server can be omitted. The institution member independently determines whether to upload the paper ticket issued by the merchant or a paper ticket of a bill of the same type as the business payment bill. That is, after the server performs step S404, if the merchant does not support issuance of an electronic ticket, step S410 is performed.

Step S410: Obtain an image of a paper ticket uploaded by the institution member and perform OCR processing.

If the merchant supports issuance of a paper ticket, second control configuration data of a paper ticket request control and third control configuration data of a paper ticket upload control are obtained, and the ticket obtaining manner of the business payment bill is configured based on the second control configuration data and the third control configuration data. For example, an icon control is configured on the right side of the business payment bill 1, and the institution member can request a paper ticket from the merchant by clicking the icon control. For another example, an arrow control is configured on the right side of the business payment bill 1, and the institution member can click the arrow control to obtain, through image capture, a ticket image of a paper ticket as a ticket associated with the business payment bill, or can use a ticket obtained after OCR processing is performed on a ticket image as a ticket associated with the business payment bill.

The server obtains the third control configuration data, and configures the ticket obtaining manner of the business payment bill based on the third control configuration data. For example, an arrow control is configured on the right side of the business payment bill 1, and the institution member can click the arrow control to obtain, through image capture, a ticket image of a paper ticket as a ticket associated with the business payment bill, or can use a ticket obtained after OCR processing is performed on a ticket image as a ticket associated with the business payment bill.

Step S412: The institution member obtains a paper ticket of the same type. It is worthwhile to note that step S412 is not performed by the server, but by the institution member. If the merchant does not support issuance of a paper ticket, in this case, the institution member can find a ticket of the same type as the business payment bill and use the ticket as a replacement to the ticket associated with the business payment bill.

Step S414: Store the obtained ticket in the member account. The electronic ticket sent by the merchant or the ticket obtained by performing OCR processing on the image of the paper ticket is stored in the member account of the institution member.

Step S416: Return the ticket to the co-managed account. The ticket is returned from the member account to the co-managed account.

Step S418: A ticket manager views and downloads the ticket. For example, the ticket manager can view or download, based on an association relationship between an institution account and the co-managed account, the ticket stored in the co-managed account.

In the method embodiment shown in FIG. 4, the processes in the above-mentioned method embodiment can be implemented. Details are omitted for simplicity here.

In conclusion, according to the ticket processing method provided in this embodiment, first, a business payment bill obtained after an institution member makes a business payment is obtained, and is stored in a member account of the institution member; then, the business payment bill is synchronized from the member account to a co-managed account that is of an institution to which the institution member belongs and that is associated with the member account, to add the business payment bill to a bill list in the co-managed account; then, a ticket associated with the business payment bill is obtained based on a ticket addition request submitted by the institution member for the business payment bill; and finally, the ticket is returned to the co-managed account based on an account association relationship between the member account and the co-managed account, to associate the ticket with the business payment bill in the bill list. In this technical solution, a ticket reimbursement procedure of the institution member can be simplified, a waiting time needed for the reimbursement procedure can be shortened, and management efficiency of the ticket manager of the institution can be correspondingly improved.

Figure 5:
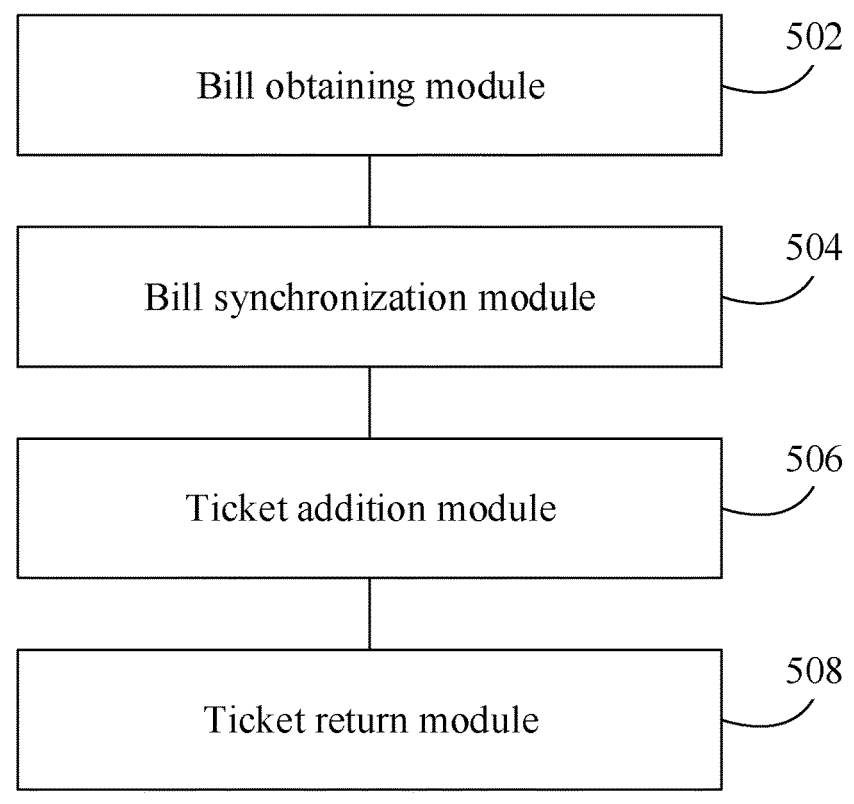
FIG. 5 is a schematic diagram of a structure of a ticket processing apparatus according to one or more embodiments of this specification.

Corresponding to the ticket processing method described in FIG. 1, based on the same technical concept, one or more embodiments of this specification further provide a ticket processing apparatus. FIG. 5 is a schematic diagram of a structure of a first ticket processing apparatus according to one or more embodiments of this specification. As shown in FIG. 5, the ticket processing apparatus includes: a bill obtaining module 502, configured to obtain a business payment bill obtained after an institution member makes a business payment, and store the business payment bill in a member account of the institution member; a bill synchronization module 504, configured to synchronize the business payment bill from the member account to a co-managed account that is of an institution to which the institution member belongs and that is associated with the member account, to add the business payment bill to a bill list in the co-managed account; a ticket addition module 506, configured to obtain, based on a ticket addition request submitted by the institution member for the business payment bill, a ticket associated with the business payment bill; and a ticket return module 508, configured to return the ticket to the co-managed account based on an account association relationship between the member account and the co-managed account, to associate the ticket with the business payment bill in the bill list.

It is worthwhile to note that the embodiment of the ticket processing apparatus in this specification is based on the same inventive concept as the embodiment of the ticket processing method in this specification. Therefore, for specific implementation of the embodiment, references can be made to the above-mentioned corresponding implementation of the ticket processing method, and repeated parts are omitted for simplicity.

Figure 6:
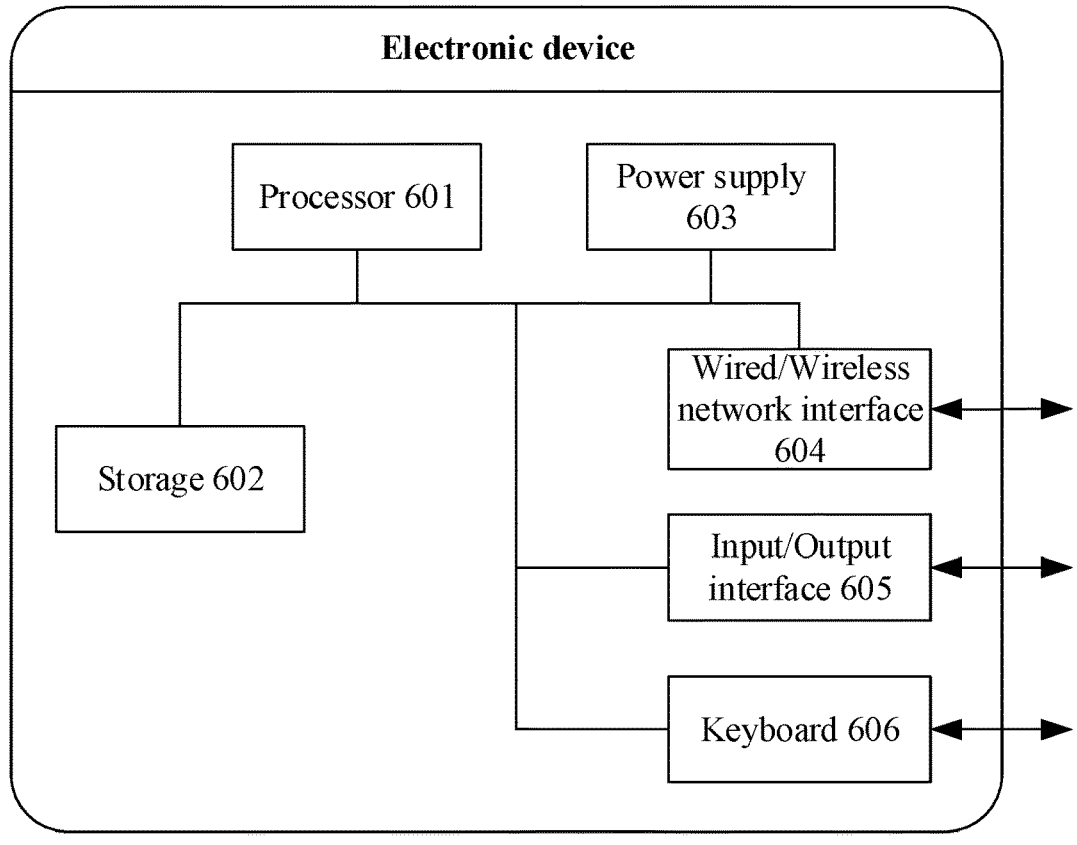
FIG. 6 is a schematic diagram of a structure of an electronic device according to one or more embodiments of this specification.

Corresponding to the ticket processing method that is described above and that is applied to an electronic device, based on the same technical concept, one or more embodiments of this specification further provide an electronic device. The electronic device is configured to perform the ticket processing method provided above. FIG. 6 is a schematic diagram of a structure of an electronic device according to one or more embodiments of this specification.

As shown in FIG. 6, the electronic device can vary greatly based on configuration or performance, and can include one or more processors 601 and a storage 602. The storage 602 can store one or more storage applications or data. The storage 602 can be a temporary storage or a persistent storage. The application stored in the storage 602 can include one or more modules (not shown in the figure), and each module can include a series of computer-executable instructions in the electronic device. Further, the processor 601 can be configured to communicate with the memory 602, and execute the series of computer-executable instructions in the memory 602 on the electronic device. The electronic device can further include one or more power supplies 603, one or more wired or wireless network interfaces 604, one or more input/output interfaces 605, one or more keyboards 606, and the like.

In a specific embodiment, the electronic device includes a storage and one or more programs. The one or more programs are stored in the storage. And the one or more programs can include one or more modules. Each module can include a series of computer-executable instructions in the electronic device, and the one or more processors are configured to execute the one or more programs to execute the following computer-executable instructions: obtaining a business payment bill obtained after an institution member makes a business payment, and storing the business payment bill in a member account of the institution member; synchronizing the business payment bill from the member account to a co-managed account that is of an institution to which the institution member belongs and that is associated with the member account, to add the business payment bill to a bill list in the co-managed account; obtaining, based on a ticket addition request submitted by the institution member for the business payment bill, a ticket associated with the business payment bill; and returning the ticket to the co-managed account based on an account association relationship between the member account and the co-managed account, to associate the ticket with the business payment bill in the bill list.

An embodiment of a storage medium provided in this specification is as follows: Corresponding to the ticket processing method described above, based on the same technical concept, one or more embodiments of this specification further provide a storage medium. In a specific embodiment, the storage medium can be a USB flash drive, an optical disc, a hard disk, or the like.

The storage medium provided in this embodiment is configured to store computer-executable instruction. When the computer-executable instructions are executed, the following procedure is implemented: obtaining a business payment bill obtained after an institution member makes a business payment, and storing the business payment bill in a member account of the institution member; synchronizing the business payment bill from the member account to a co-managed account that is of an institution to which the institution member belongs and that is associated with the member account, to add the business payment bill to a bill list in the co-managed account; obtaining, based on a ticket addition request submitted by the institution member for the business payment bill, a ticket associated with the business payment bill; and returning the ticket to the co-managed account based on an account association relationship between the member account and the co-managed account, to associate the ticket with the business payment bill in the bill list.

It should be noted that the embodiment of the storage medium in this specification is based on the same inventive concept as the embodiment of the ticket processing method in this specification. Therefore, for specific implementation of the embodiment, references can be made to the above-mentioned implementation of the corresponding method, and repeated parts are omitted for simplicity.

Specific embodiments of this specification are described above. Other embodiments fall within the scope of the appended claims. In some cases, actions or steps described in the claims can be performed in a sequence different from that in the embodiments and desired results can still be achieved. In addition, the process depicted in the accompanying drawings does not necessarily need a particular sequence or consecutive sequence to achieve the desired results. In some implementations, multi-tasking and parallel processing are feasible or may be advantageous.

In the 1930s, whether a technical improvement is a hardware improvement (for example, an improvement to a circuit structure, such as a diode, a transistor, or a switch) or a software improvement (an improvement to a method procedure) can be clearly distinguished. However, as technologies develop, current improvements to many method procedures can be considered as direct improvements to hardware circuit structures. A designer usually programs an improved method procedure into a hardware circuit to obtain a corresponding hardware circuit structure. Therefore, a method procedure can be improved by using a hardware entity module. For example, a programmable logic device (PLD) (for example, a field programmable gate array (FPGA)) is such an integrated circuit, and a logical function of the programmable logic device is determined by a user through device programming. The designer performs programming to "integrate" a digital system to a PLD without requesting a chip manufacturer to design and produce an application-specific integrated circuit chip. In addition, at present, instead of manually manufacturing an integrated circuit chip, such programming is mostly implemented by using "logic compiler" software. The "logic compiler" software is similar to a software compiler used to develop and write a program. Original code needs to be written in a particular programming language before being compiled. The language is referred to as a hardware description language (HDL). There are many HDLs, such as the Advanced Boolean Expression Language (ABEL), the Altera Hardware Description Language (AHDL), Confluence, the Cornell University Programming Language (CUPL), HDCal, the Java Hardware Description Language (JHDL), Lava, Lola, MyHDL, PALASM, and the Ruby Hardware Description Language (RHDL). At present, the Very-High-Speed Integrated Circuit Hardware Description Language (VHDL) and Verilog are most commonly used. A person skilled in the art should also understand that a hardware circuit that implements a logical method procedure can be readily obtained once the method procedure is logically programmed by using some described hardware description languages and is programmed into an integrated circuit.

A controller can be implemented by using any appropriate method. For example, the controller can be a microprocessor or a processor, or a computer-readable medium that stores computer-readable program code (such as software or firmware) that can be executed by the microprocessor or the processor, a logic gate, a switch, an application-specific integrated circuit (ASIC), a programmable logic controller, or a built-in microprocessor. Examples of the controller include but are not limited to the following microprocessors: ARC 625D, Atmel AT91SAM, Microchip PIC18F26K20, and Silicone Labs C8051F320. The storage controller can also be implemented as a part of the control logic of the storage. A person skilled in the art also knows that in addition to implementing the controller by using only the computer-readable program code, logic programming can be performed on method steps to enable the controller to implement the same function in forms of the logic gate, the switch, the application-specific integrated circuit, the programmable logic controller, the built-in microcontroller, and the like. Therefore, the controller can be considered as a hardware component, and an apparatus configured to implement various functions in the controller can also be considered as a structure in the hardware component. Alternatively, the apparatus configured to implement various functions can even be considered as both a software module implementing the method and a structure in the hardware component.

The system, apparatus, module, or unit illustrated in the above-mentioned embodiments can be specifically implemented by using a computer chip or an entity, or can be implemented by using a product having a specific function. A typical implementation device is a computer. Specifically, the computer can be, for example, a personal computer, a laptop computer, a cellular phone, a camera phone, a smartphone, a personal digital assistant, a media player, a navigation device, an email device, a game console, a tablet computer, a wearable device, or a combination of any of these devices.

For ease of description, the above-mentioned apparatus is described by dividing functions into various units. Certainly, when the embodiments of this specification are implemented, functions of the units can be implemented in one or more pieces of software and/or hardware.

A person skilled in the art should understand that one or more embodiments of this specification can be provided as methods, systems, or computer program products. Therefore, one or more embodiments of this specification can use a form of hardware only embodiments, software only embodiments, or embodiments with a combination of software and hardware. In addition, a form of a computer program product that is implemented on one or more computer-usable storage media (including but not limited to a disk storage, a CD-ROM, an optical storage, or the like) that include computer-usable program code can be used in this specification.

This specification is described with reference to the flowcharts and/or block diagrams of the method, the device (system), and the computer program product according to the embodiments of this specification. It should be understood that computer program instructions can be used to implement each procedure and/or each block in the flowcharts and/or the block diagrams and a combination of a procedure and/or a block in the flowcharts and/or the block diagrams. These computer program instructions can be provided for a general-purpose computer, a dedicated computer, an embedded processor, or a processor of another programmable data processing device to generate a machine, so the instructions executed by the computer or the processor of the another programmable data processing device generate an apparatus for implementing a specific function in one or more procedures in the flowcharts and/or in one or more blocks in the block diagrams.

Alternatively, these computer program instructions can be stored in a computer-readable storage that can instruct a computer or another programmable data processing device to work in a specific way, so the instructions stored in the computer-readable storage generate an artifact that includes an instruction apparatus. The instruction apparatus implements a specific function in one or more procedures in the flowcharts and/or in one or more blocks in the block diagrams.

Alternatively, these computer program instructions can be loaded onto a computer or another programmable data processing device, so that a series of operations and steps are performed on the computer or the another programmable device, to generate computer-implemented processing. Therefore, the instructions executed on the computer or the another programmable device provide steps for implementing a specific function in one or more procedures in the flowcharts and/or in one or more blocks in the block diagrams.

In a typical configuration, a computing device includes one or more processors (CPUs), one or more input/output interfaces, one or more network interfaces, and one or more memories.

The memory can include a non-persistent memory, a random access memory (RAM), a nonvolatile memory, and/or another form in a computer-readable medium, for example, a read-only memory (ROM) or a flash memory (flash RAM). The memory is an example of the computer-readable medium.

The computer-readable medium includes persistent, non-persistent, removable and non-removable media that can store information by using any method or technology. The information can be computer-readable instructions, a data structure, a program module, or other data. Examples of the computer storage medium include but are not limited to a phase change random access memory (PRAM), a static random access memory (SRAM), a dynamic random access memory (DRAM), a random access memory (RAM) of another type, a read-only memory (ROM), an electrically erasable programmable read-only memory (EEPROM), a flash memory or another memory technology, a compact disc read-only memory (CD-ROM), a digital versatile disc (DVD), or another optical storage, a cassette, a cassette magnetic disk storage, or another magnetic storage device or any other non-transmission medium. The computer storage medium can be configured to store information that can be accessed by a computing device. As described in this specification, the computer-readable medium does not include computer-readable transitory media such as a modulated data signal and a carrier.

It is worthwhile to further note that the terms "include", "comprise", or any other variant thereof are intended to cover a non-exclusive inclusion, so that a process, a method, a product, or a device that includes a list of elements not only includes those elements but also includes other elements which are not expressly listed, or further includes elements inherent to such process, method, product, or device. Without more constraints, an element preceded by "includes a . . ." does not preclude the existence of additional identical elements in the process, method, product, or device that includes the element.

One or more embodiments of this specification can be described in the general context of computer-executable instructions, for example, a program module. Generally, the program module includes a routine, a program, an object, a component, a data structure, and the like for executing a specific task or implementing a specific abstract data type. One or more embodiments of this specification can alternatively be practiced in distributed computing environments. In the distributed computing environments, tasks are performed by remote processing devices connected through a communication network. In the distributed computing environments, the program module can be located in a local and remote computer storage medium including a storage device.

The embodiments in this specification are described in a progressive manner. For the same or similar parts of the embodiments, references can be made to the embodiments. Each embodiment focuses on a difference from other embodiments. Particularly, the system embodiments are basically similar to the method embodiments, and therefore are described briefly. For related parts, references can be made to some descriptions in the method embodiments.

The above-mentioned descriptions are merely embodiments of this specification, and are not intended to limit this specification. A person skilled in the art can make various changes and variations to this specification. Any modification, equivalent replacement, or improvement made without departing from the spirit and principle of this specification shall fall within the scope of the claims in this specification.

What is claimed is:

1. A ticket processing method, comprising:

mounting, by a computer file system, a co-managed account of an institution to a fund account, the mounting comprising making files of fund account on the computer file system accessible by a member account of an institution member using the co-managed account;

obtaining a business payment bill obtained after the institution member makes a business payment using funds in the fund account, and storing the business payment bill in the member account of the institution member;

synchronizing the business payment bill from the member account to a co-managed account that is of an institution to which the institution member belongs and that is associated with the member account, to add the business payment bill to a bill list in the co-managed account;

performing optical character recognition (OCR) on a ticket image based on a ticket addition request submitted by the institution member for the business payment bill to obtain a ticket associated with the business payment bill; and returning the ticket to the co-managed account based on an account association relationship between the member account and the co-managed account, to associate the ticket with the business payment bill in the bill list.

2. The method according to claim 1, further comprising:

obtaining a confirmation request for making the business payment by the institution member, wherein the confirmation request carries a member account identifier of the member account of the institution member and a fund account identifier of the fund account of the institution, and the member account and the fund account are associated with the co-managed account; and obtaining the business payment bill obtained after the business payment is made based on the member account identifier and the fund account identifier.

3. The method according to claim 1, further comprising:

obtaining configuration data of an associated ticket upload page based on an associated ticket upload request submitted by the institution member for the business payment bill, to generate an associated ticket upload page corresponding to the business payment bill; and obtaining the ticket image of a paper ticket uploaded by the institution member on the ticket upload page.

4. The method according to claim 1, further comprising:

generating a ticket request message based on an electronic ticket obtaining request submitted by the institution member for the business payment bill, and sending the ticket request message to a merchant corresponding to the business payment bill, wherein the electronic ticket obtaining request carries a member account identifier and a bill identifier of the business payment bill;

obtaining an electronic ticket sent by the merchant based on the member account identifier, wherein the electronic ticket is issued by the merchant based on the bill identifier; and associating the electronic ticket with the business payment bill.

5. The method according to claim 1, further comprising:

determining, based on a bill selection operation performed by the institution member, a plurality of business payment bills selected by the institution member; and obtaining, based on a combined ticket addition request, tickets associated with the plurality of business payment bills.

6. The method according to claim 1, further comprising:

obtaining ticket issuance information of a merchant corresponding to the business payment bill;

determining, based on the ticket issuance information, whether the merchant supports issuance of an electronic ticket; and upon determining that the merchant supports issuance of an electronic ticket, obtaining first control configuration data of an electronic ticket request control; and configuring a ticket obtaining manner of the business payment bill based on the first control configuration data.

7. The method according to claim 6, wherein if an execution result obtained after the step of determining, based on the ticket issuance information, whether the merchant supports issuance of an electronic ticket is no, the following operations are performed:

determining, based on the ticket issuance information, whether the merchant supports issuance of a paper ticket; and upon determining that the merchant supports issuance of a paper ticket, obtaining second control configuration data of a paper ticket request control and third control configuration data of a paper ticket upload control, and configuring the ticket obtaining manner of the business payment bill based on the second control configuration data and the third control configuration data; or upon determining that the merchant does not support issuance of a paper ticket, obtaining third control configuration data, and configuring the ticket obtaining manner of the business payment bill based on the third control configuration data.

8. The method according to claim 1, further comprising:

creating the co-managed account based on a co-managed account establishment request of a ticket manager;

associating an institution account and a fund account of the ticket manager with the co-managed account based on an institution role preset for the co-managed account; and associating a member account of each institution member with the co-managed account based on a member role preset for the co-managed account.

9. The method according to claim 1, further comprising:

obtaining, based on a bill access request of the institution member, a member bill list that is in the member account and that comprises each business payment bill;

querying a ticket status of any business payment bill in the member bill list; and upon determining that the ticket status is "not returned", obtaining addition control configuration data of a ticket addition control; and rendering and generating a display page of the member bill list based on the member bill list and the addition control configuration data.

10. The method according to claim 8, further comprising:

obtaining a bill access condition submitted by the ticket manager by using the institution account;

obtaining a target bill list that meets the bill access condition from the bill list based on an association relationship between the institution account and the co-managed account; and processing, based on an associated ticket processing request submitted by the ticket manager for a target bill in the target bill list, a ticket associated with the target bill.

11. The method according to claim 10, wherein the processing, based on an associated ticket processing request submitted by the ticket manager for a target bill in the target bill list, a ticket associated with the target bill comprises:

obtaining, based on a ticket view request submitted by the ticket manager for the target bill, a target ticket associated with the target bill and configuration data of a ticket display page, to render and generate a ticket display page of the target ticket.

12. The method according to claim 10, wherein the processing, based on an associated ticket processing request submitted by the ticket manager for a target bill in the target bill list, a ticket associated with the target bill comprises:

sending, based on a ticket return prompt request submitted by the ticket manager for the target bill, ticket return prompt information to a member account that returns the target bill.

13. An electronic device, comprising:

a memory and a processor, wherein the memory stores executable instructions that, in response to execution by the processor, cause the processor to:

mount, by a computer file system, a co-managed account of an institution to a fund account, the mounting comprising making files of fund account on the computer file system accessible by a member account of an institution member using the co-managed account;

obtain a business payment bill obtained after the institution member makes a business payment using funds in the fund account, and storing the business payment bill in the member account of the institution member;

synchronize the business payment bill from the member account to a co-managed account that is of an institution to which the institution member belongs and that is associated with the member account, to add the business payment bill to a bill list in the co-managed account;

perform optical character recognition (OCR) on a ticket image based on a ticket addition request submitted by the institution member for the business payment bill to obtain a ticket associated with the business payment bill; and return the ticket to the co-managed account based on an account association relationship between the member account and the co-managed account, to associate the ticket with the business payment bill in the bill list.

14. A non-transitory computer-readable storage medium, comprising instructions stored therein that, when executed by a processor of a computer device, cause the processor to:

mount, by a computer file system, a co-managed account of an institution to a fund account, the mounting comprising making files of fund account on the computer file system accessible by a member account of an institution member using the co-managed account;

obtain a business payment bill obtained after the institution member makes a business payment using funds in the fund account, and storing the business payment bill in the member account of the institution member;

synchronize the business payment bill from the member account to a co-managed account that is of an institution to which the institution member belongs and that is associated with the member account, to add the business payment bill to a bill list in the co-managed account;

performing optical character recognition (OCR) on a ticket image based on a ticket addition request submitted by the institution member for the business payment bill to obtain a ticket associated with the business payment bill; and return the ticket to the co-managed account based on an account association relationship between the member account and the co-managed account, to associate the ticket with the business payment bill in the bill list.

* * * * *